United States Patent [19]
Peters

[11] Patent Number: 5,272,703
[45] Date of Patent: Dec. 21, 1993

[54] N-BIT PARALLEL INPUT TO VARIABLE-BIT PARALLEL OUTPUT SHIFT REGISTER

[75] Inventor: Richard W. Peters, Raleigh, N.C.

[73] Assignee: Alcatel Network Systems, Inc., Richardson, Tex.

[21] Appl. No.: 807,704

[22] Filed: Dec. 16, 1991

[51] Int. Cl.[5] .................................................. H04J 3/07
[52] U.S. Cl. .................................. 370/102; 370/105.1; 375/112
[58] Field of Search ............ 370/102, 101, 99, 100.1, 370/79, 82, 83, 105.1, 108; 375/112

[56] References Cited

U.S. PATENT DOCUMENTS

| | | | |
|---|---|---|---|
| 4,301,538 | 11/1981 | Desombre et al. | 375/4 |
| 4,928,275 | 5/1990 | Moore et al. | 370/102 |
| 5,030,951 | 7/1991 | Eda et al. | 370/102 |
| 5,033,067 | 7/1991 | Cole et al. | 377/54 |
| 5,052,025 | 9/1991 | Duff et al. | 375/118 |
| 5,067,126 | 11/1991 | Moore | 370/102 |

FOREIGN PATENT DOCUMENTS 0397358 11/1990 European Pat. Off. .

Primary Examiner—Douglas W. Olms
Assistant Examiner—Melvin Marcelo
Attorney, Agent, or Firm—Ware, Fressola, Van Der Sluys & Adolphson

[57] ABSTRACT

N-parallel bits of data are input to a parallel in-parallel out shift register made of $n+m$ $n:1$ parallel multiplexers and n-parallel bits of either pure data or combined stuff and data bits are output where, for cycles in which stuff bits are inserted, the non-outputted outputted data bits are recirculated for output on a subsequent cycle followed by newly incoming data bits; such is shown used to advantage in a bit stuffing technique where a synchronous payload envelope pattern may be started at a selected location in a synchronous transport signal frame by monitoring a frame starting signal and providing a pattern starting signal at a selected point after the occurrence of the frame starting signal.

7 Claims, 12 Drawing Sheets

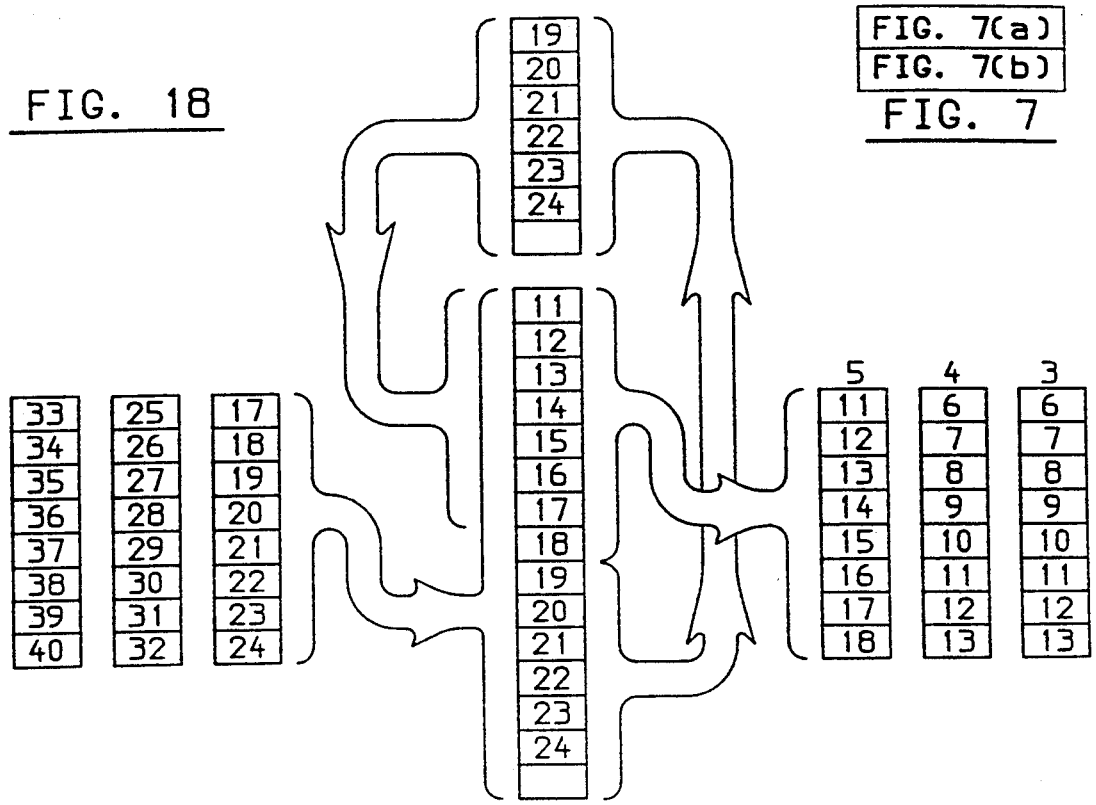
FIG. 18
FIG. 7(a)
FIG. 7(b)
FIG. 7
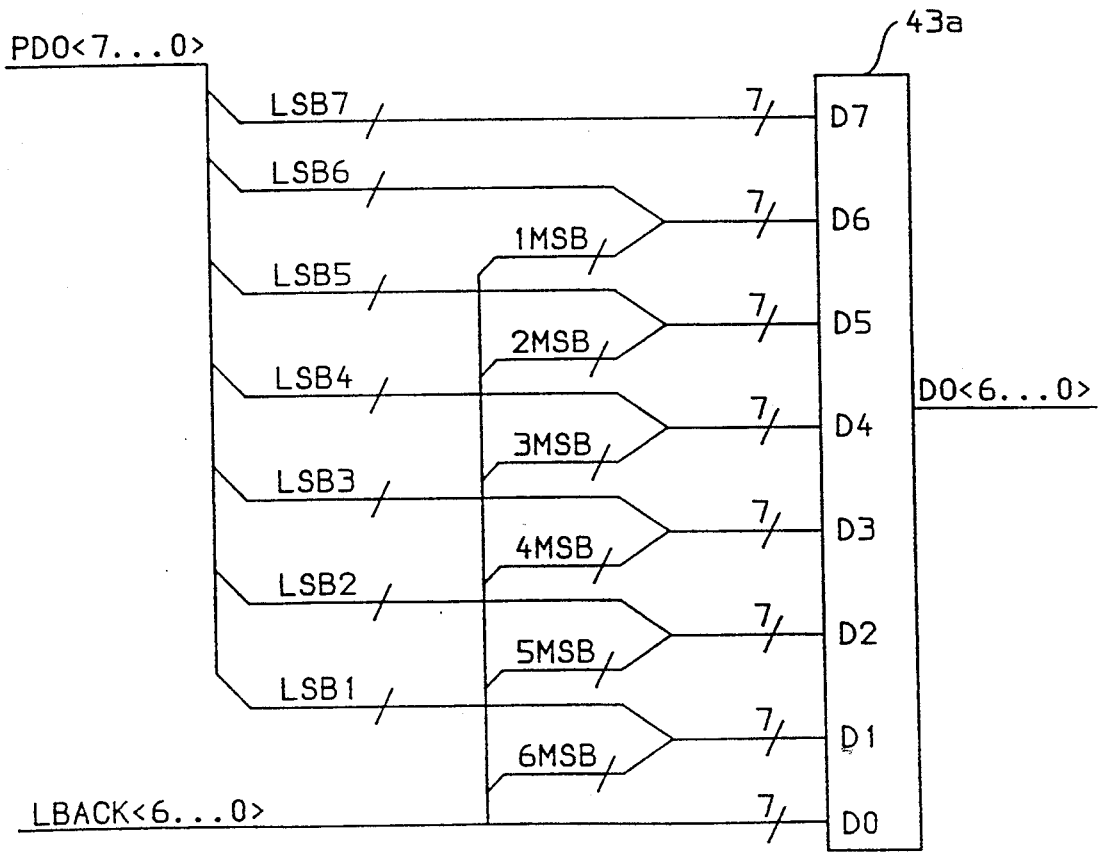
FIG. 9

N-BIT PARALLEL INPUT TO VARIABLE-BIT PARALLEL OUTPUT SHIFT REGISTER

TECHNICAL FIELD

This invention relates to multiplex communications and, more particularly, to multiplexing signals of different rates from various transmitters.

BACKGROUND ART

In serial input to parallel output shift registers, a serial bit stream is clocked through a series of serial registers and latched into parallel outputs. The number of parallel bits on the output is dependent on the number of bits shifted serially through the registers before a parallel latch is enabled.

Such a device has certain shortcomings, for example, in a bit stuffing multiplexer circuit. A bit stuffing multiplexer inputs a signal at one frequency and stuffs (adds) bits into that signal, thus outputting a signal at a higher frequency. Such are useful in multiplexing schemes for interleaving signals of different rates. See, for example, American National Standards for Telecommunications, Digital Hierarchy-Optical Interface Rates and Formats Specification, ANSI T1.105-1988. The multiplexer circuit consists of a buffer, a buffer write controller and a buffer read controller. The serial input to parallel output shift register will be located in the write controller and will generate the bit stuffing pattern by outputting gaps in the input signal where stuff data will be located. The read controller will generate the output signal framing pattern by placing additional gaps in the input signal.

The shortcomings of the above mentioned device in the bit stuffing multiplexer example are that (1) the location of the start of the bit stuffing pattern determined by the write controller cannot easily be fixed relative to the framing pattern, and (2) a control signal(s) from the write controller to the read controller must be passed through the buffer. The bit stuffing pattern is generated using a clock on the input side of the buffer, a clock that is asynchronous to the output clock. Therefore, when the circuit is initialized, the bit stuffing pattern will start at random locations relative to the framing pattern of the output signal. The start of the bit stuffing pattern could be fixed relative to the framing pattern if control signals were passed through an additional buffer, but passing control signals through a buffer creates other shortcomings. If the circuit writing the control signals into the buffer fails when a control signal is in the buffer, then the read control circuit will read the control signal at a rate much higher than the bit stuffing pattern rate which will corrupt the framing pattern of the output signal.

SUMMARY OF THE INVENTION

According to the present invention, n-parallel bits of data are input and an n-parallel bits of either pure data or combined stuff and data bits are output. For cycles in which stuff bits are inserted, a number of data bits are not output and are instead recirculated for output on a subsequent cycle followed by newly incoming data bits.

In a bit stuffing multiplexer, the shortcomings described above may be overcome by placing control of the bit stuffing operation in the buffer read controller. For example, an eight-bit parallel input to variable bit parallel output shift register may be placed in the buffer read controller of the bit stuffing multiplexer to allow the read controller to generate the bit stuffing pattern, thus fixing it to a known location in the framing pattern. The buffer write controller may then be used as a simple write address counter. A constant number of data bits are written into the buffer without any stuff bits or control signals. The read controller extracts a variable number of bits per byte to perform the bit stuffing operations. The bit stuffing pattern can thus be fixed relative to the framing pattern and there is no need for control information to pass through the buffer.

The invention may be used in numerous applications including asynchronous multiplexers that convert DS-1 to STS-1, DS-3 to STS-1, FDDI to STS-3, DS4NA to STS-3, etc.

Other objects, advantages and features of the present invention will become apparent from the following detailed description when taken in connection with the accompanying drawing.

BRIEF DESCRIPTION OF THE DRAWING

FIG. 7 shows the relation between FIGS. 7(a) and 7(b).

FIG. 9 shows a more general version of the multiplexer 43 of FIG. 8;

FIGS. 10 through 18 show nine successive cycles in providing column 87, 3 TOH columns and columns 1–5 of FIG. 2.

BEST MODE FOR CARRYING OUT THE INVENTION

Figure 1:
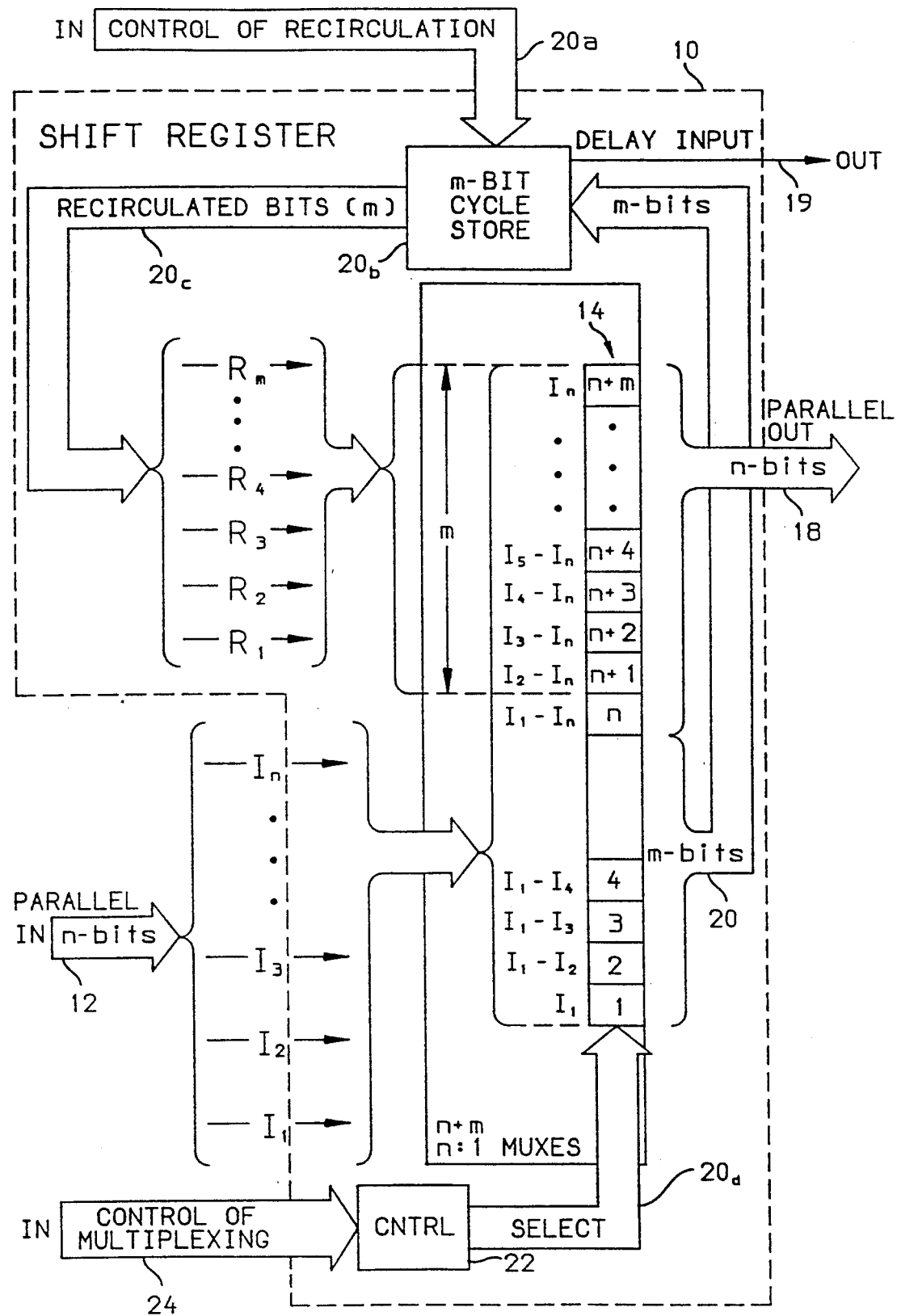
FIG. 1 shows an n bit parallel input to variable bit parallel output shift register, according to the present invention.

FIG. 1 shows an n bit parallel input to variable bit parallel output shift register 10, according to the present invention. Such may be used in a read controller of a bit stuffing multiplexer which will also have a write controller used as a simple address counter and a buffer responsive to incoming data for providing same as n-bit parallel input data ($I_1 \ldots I_n$) on a line 12 to the register 10.

In the example, the incoming data on the line 12 is wholly data (I) bits with no stuff (don't care) bits. Such might be eight bit parallel data as may be represented in FIG. 2 in a level one, synchronous transport signal (STS-1) synchronous payload envelope (SPE) 16. The illustrated envelope has a plurality, e.g., eighty-seven bytes which can consist of both I bits and stuff bits which may, but need not be "don't cares"(X), as shown, for simplicity. Of course, other types of bits and bytes such as path overhead bytes, stuff control bits, stuff opportunity bits, overhead communications channel bytes, fixed stuff bits, etc., may be employed as well.

Most of the bytes indicated have all I bits but some are wholly X bits with two being a combination of I and X bits, i.e., bytes numbered four (4) and sixty-one (61).

Figure 2:
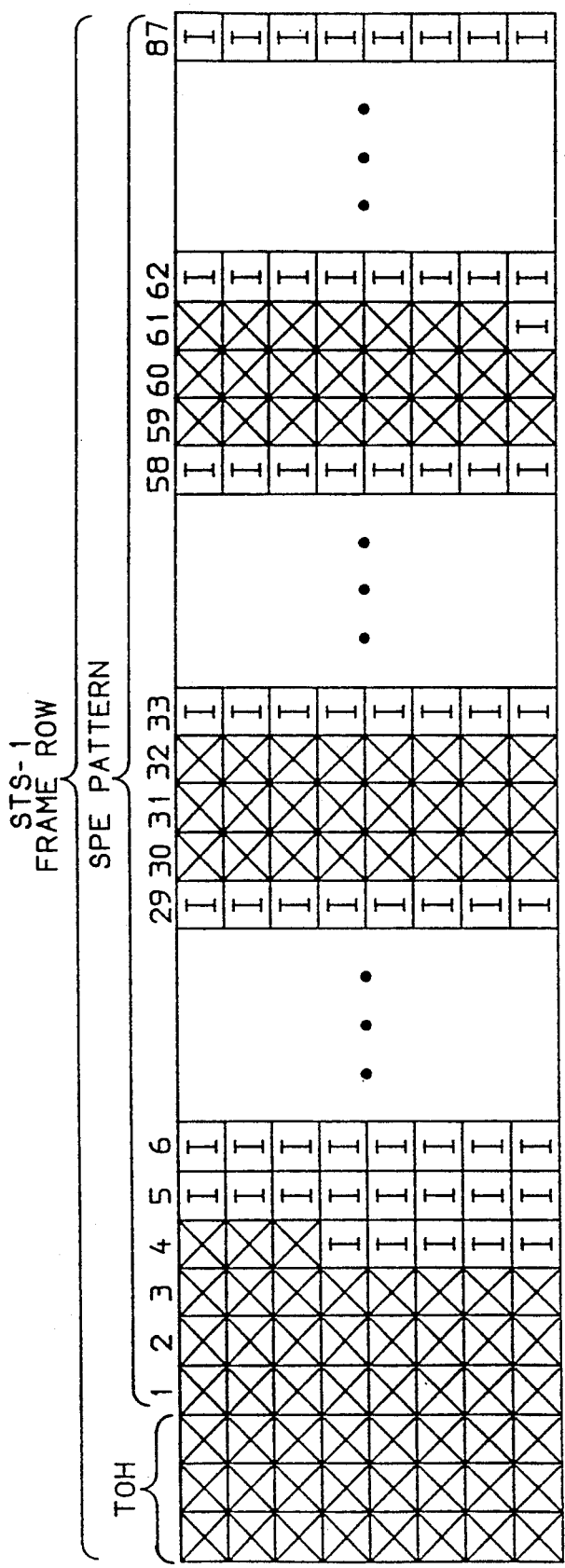
FIG. 2 is an illustration of a data pattern with stuff bits such as provided at the output of the device of FIG. 1 with ninety columns of bytes for transmission in parallel, one byte at a time, from left to right.

The function of the shift register of FIG. 1, as illustrated in the context of an STS-1 row is to provide, in response to an orderly sequence of wholly data ("I") input bytes on the line 12, a similarly timed but differently organized sequence of output bytes (1-90) on a line 18, from left to right, such as shown in FIG. 2. It provides the wholly X bytes (TOH, 1-3, 30-32, 59 and 60), by providing a delay signal on a line 19 to the read controller for delaying for one cycle the input of the next I byte and outputting X's on line 18 instead. For selected bytes (byte 4 and, when a recirculation control signal on a line 20a is active, byte 61) it outputs as many of the more significant I bits as it can, 5 bits for column 4 and possibly 1 bit for column 61, given the size of the n-bit output line 18, and recirculates on a line 20 the remaining I bits of lesser significance for output on the next cycle as the more significant bits of signal line 18. Thus, the I bits are located in the LSB locations of the bytes in SPE columns 4 and 61, but the circuit 10 outputs these bits on the MSBs of line 18. A different circuit (not shown) may be used to shift them to their original locations. The circuit 10 does the same in bytes after bytes 4 and 61, with recirculated I bits of lesser significance. Thus, the incoming I bits are always output on n adjacent multiplexers but, in some cycles, only some of them may be output on line 18 in the same cycle in which it is input. If the shift register is too full of bits due to bit stuffing to allow the input of additional I bits, the input can be delayed a cycle or more by providing the signal on line 19 to empty the register or to at least allow the less significant bits to be recirculated to make room for a newly incoming I byte.

In response to the recirculation control signal on the line 20a, an m-bit cycle store 20b stores the recirculated m bits from the m least significant bits of the n+m multiplexers and inputs the stored bits on a line 20c to the inputs of the m most significant bits of the multiplexers on the next available cycle.

In the context of the example, the plurality (e.g., (n+m)=15, where n=8 and m=7) of 8:1 multiplexers are connected in parallel. The bits ($I_1$-$I_8$) of input line 12 are connected to the fifteen 8:1 multiplexers in such a way that bits $I_1$ through $I_8$ of the input byte may be provided on the outputs of any selected group of eight adjacent multiplexers (eight possibilities).

If a select line 20d selects "zero", meaning no down shift, the input bits $I_1$ to $I_8$ are output by multiplexers 8 to 15 and thus with no downward shift of the output pattern of the contiguous input I bits, i.e., no transition of any of the less significant, currently input I bits to a subsequently output byte, and no stuff bits. On the other hand, if the select line 20d selects a shift down number one through seven, the input bits will be shifted downward by the selected number of bits and thus will be output on eight adjacent multiplexers having a most significant bit from fourteen through eight, respectively. A control 22 provides the select signal on the line 20d in response to a control signal on a line 24.

It will be seen that, under this scheme, the currently input byte has its eight I bits output on eight contiguous multiplexers anywhere within the range of the fifteen multiplexer register. Only one ("zero" shift) of those eight choices, however, will result in all eight I bits being output altogether on the line 18. All of the seven other choices result in some of the bits being recirculated for output later.

Figure 3:
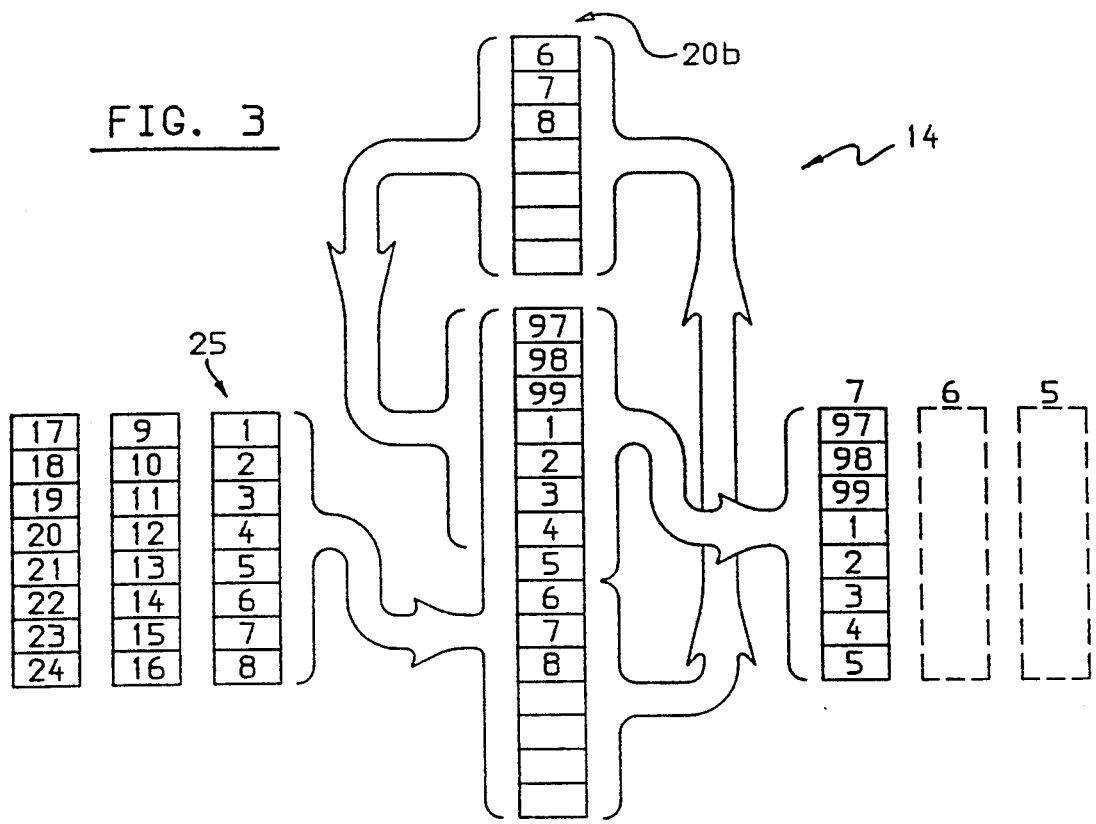
FIGS. 3 through 6 show four successive input/output cycles of the shift register of FIG. 1 in providing columns seven through ten of FIG. 2.

Referring now to FIGS. 3 through 6, stylized representations of four input/output cycles of a device 14 such as depicted in FIG. 1 are shown. In the device 14 for FIGS. 3-11, n=8 and m=7, in order to illustrate a particular embodiment of the invention which is capable of creating the SPE of FIG. 2. In FIG. 3, an input/output cycle that rearranges information provided as an input byte 25 into the form that would be found in column seven of FIG. 2 is shown. Two input bytes containing I bits 9-16 and 17-24 are shown queued, e.g., in a buffer (not shown), behind a byte containing bits 1-8 to suggest the information to be provided in succeeding cycles. Columns six and five are shown in phantom to the right of column seven to indicate that they were created in the two prior input/output cycles. In other words, for FIGS. 3-6, the stylized representations of bytes may be thought of as showing a historical time-line of snapshots of cycles with the increasingly distant future cycles toward the left, the increasingly distant past toward the right and the present in the middle.

The register 14 will not contain any real "don't cares." The bits on the output 18 that may be designated "don't care" are duplicated data bits which will be overwritten in later circuits (not shown). For example, if the bits that are in the column 4 location are labeled 1 through 8, with 1 the MSB, then later the following circuits will shift bits 1-5 into proper location and overwrite bits 6-8. The register will recirculate bits 6-8 and output them in column 5 as MSBs.

For the representation of FIG. 3, the select line 20d of FIG. 1 will provide a binary three to the multiplexers 14. This will cause the multiplexers to output byte 25 on the fourth through the eleventh most significant multiplexer outputs as shown. Thus, only the five most significant bits of byte 25 are output as column seven with the three most significant bits having been recirculated from the previous cycle. The three least significant bits of byte 25 are loaded into storage device 20b until needed during the next information input/output cycle. In general, a new information byte will be presented from the buffer when the number of bits being stuffed plus the number of bits leftover from prior cycles plus new data bits will not cause the register to overflow. Overflow is prevented from occurring by a CARRY signal, shown below in FIG. 8, which stops the next byte from being input on the line 12.

Figure 4:
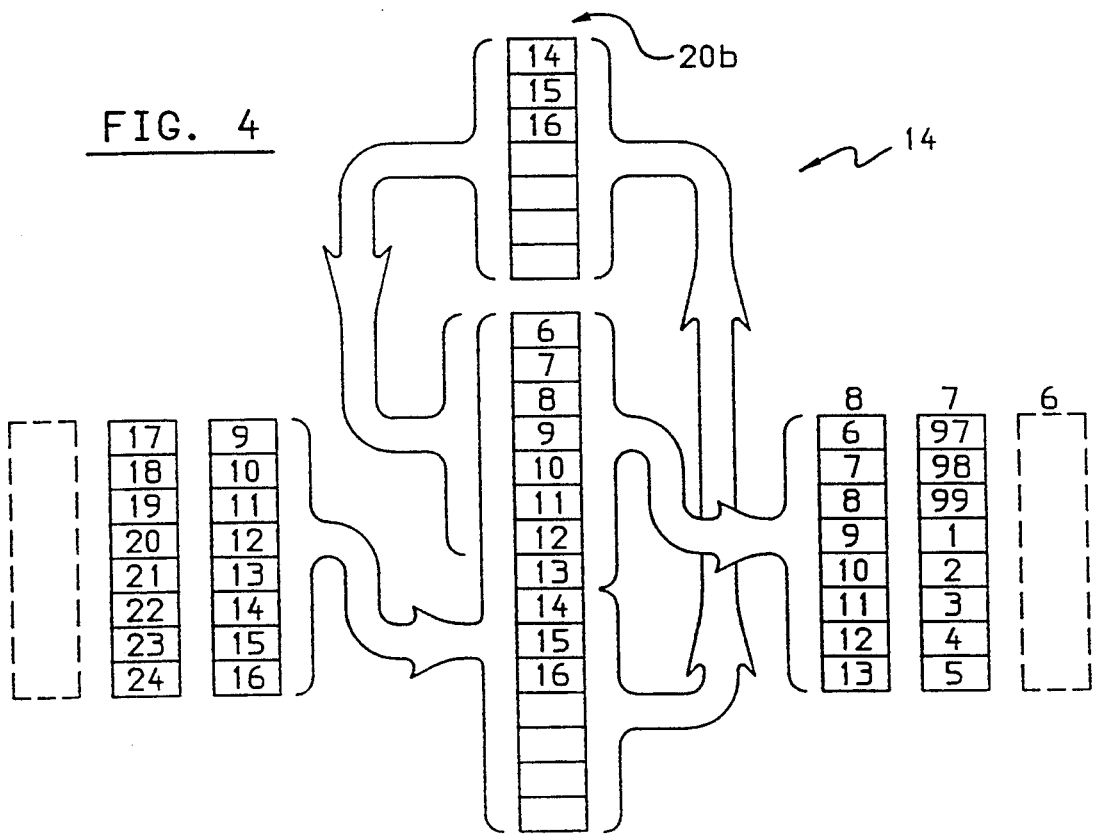

FIG. 4 shows the creation of column 8 from bits 6-8 of the prior cycle and incoming I bits 9-13. Incoming I bits 14-16 are stored in the device 20b for the next I bit cycle.

Figure 5:
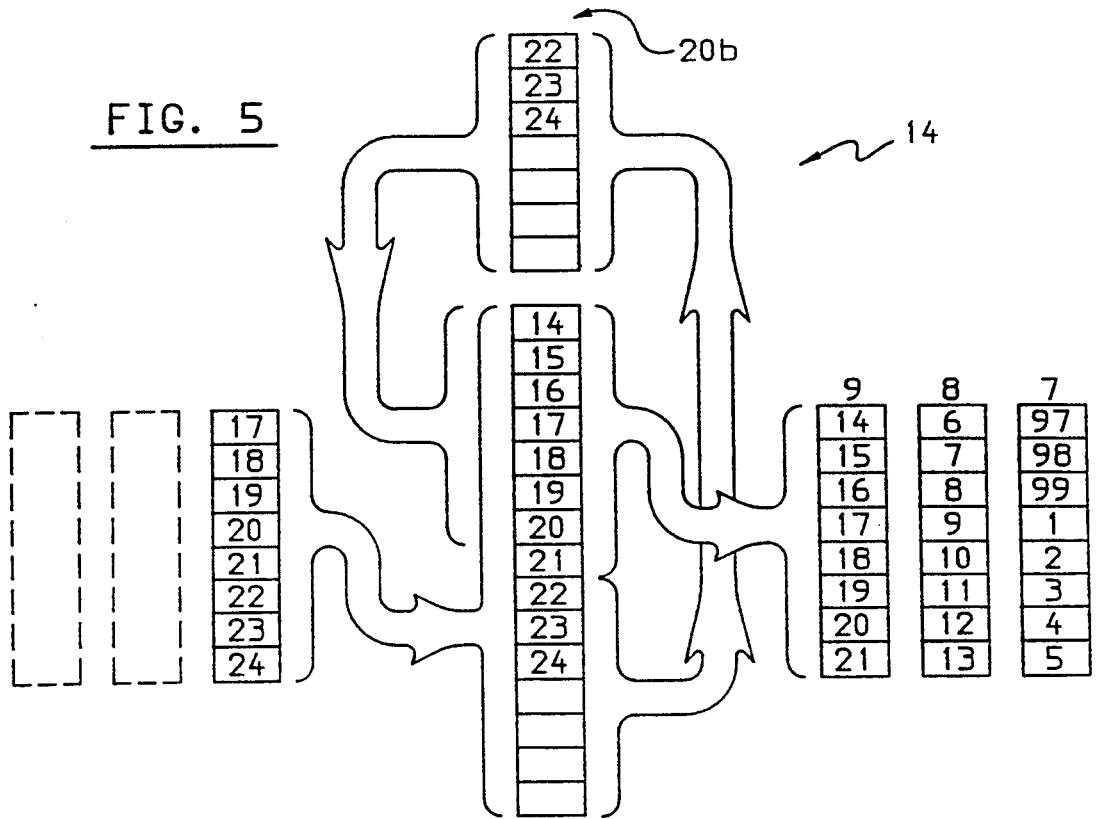

FIG. 5 shows the creation of column 9 from bits 14-16 of the prior cycle and incoming I bits 17-21. Incoming I bits 22-24 are stored in the device 20b for the next I bit cycle.

Figure 6:
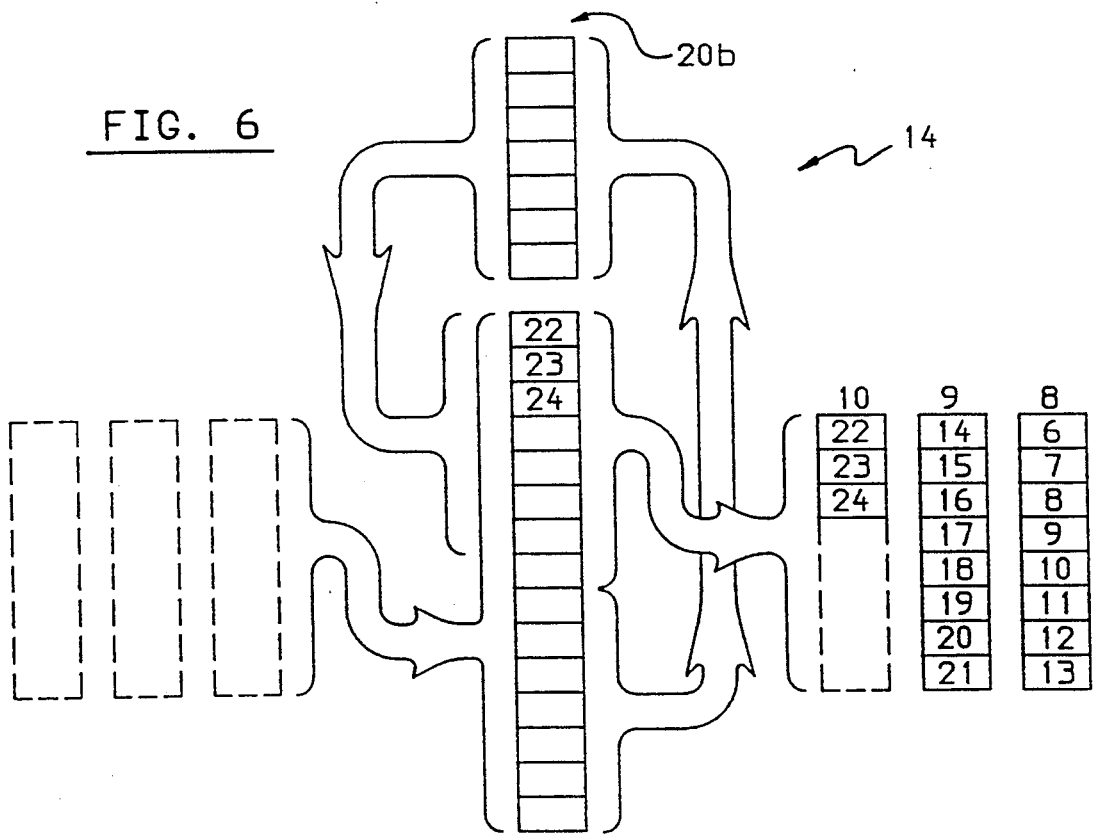

FIG. 6 in part shows the creation of column 10 from bits 22-24 of the prior cycle and incoming I bits (not shown).

Figure 7A:
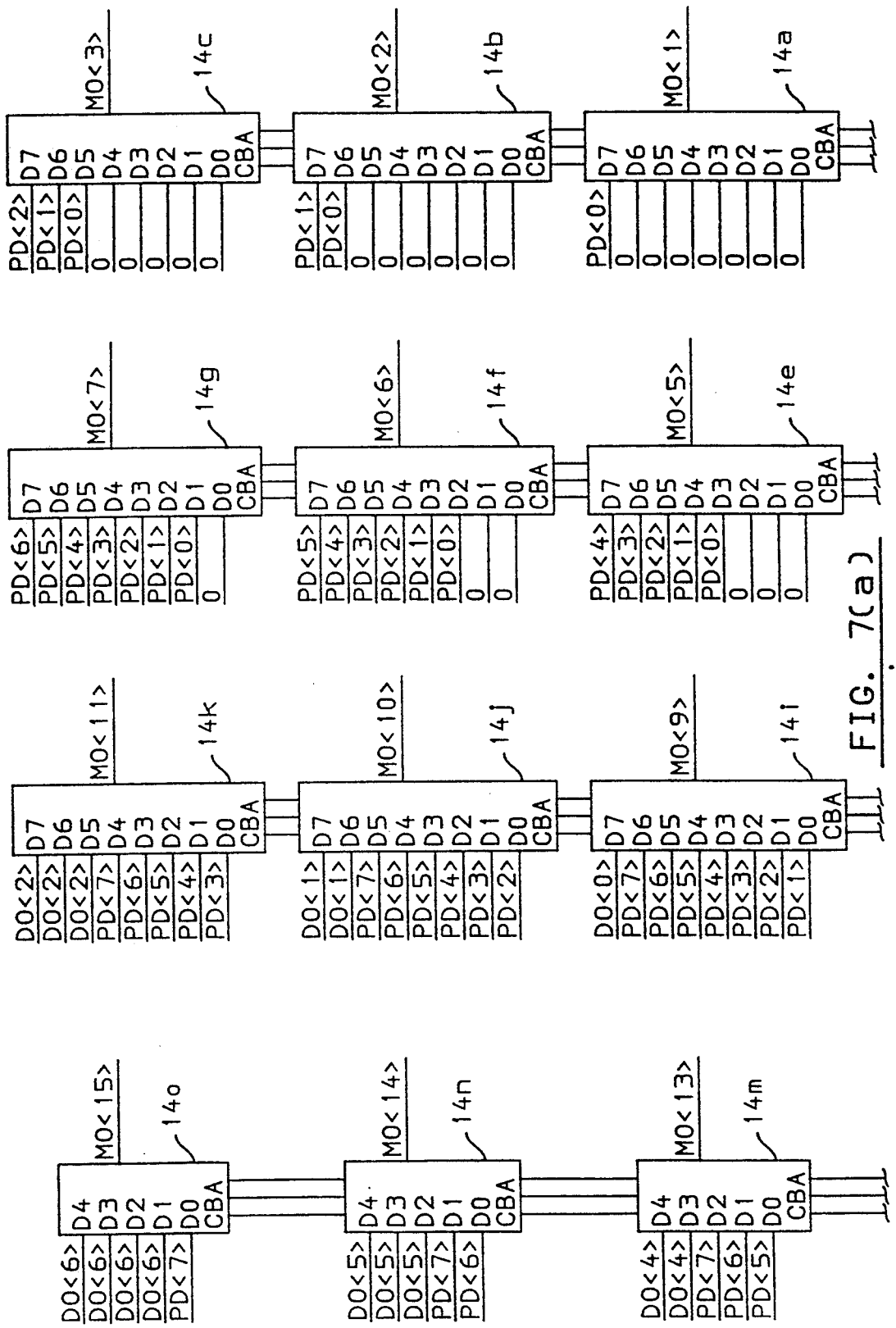
FIGS. 7(a) and 7(b) together show a plurality of multiplexers in parallel and a control such as may be used together as in the device of FIG. 1.
Figure 7B:
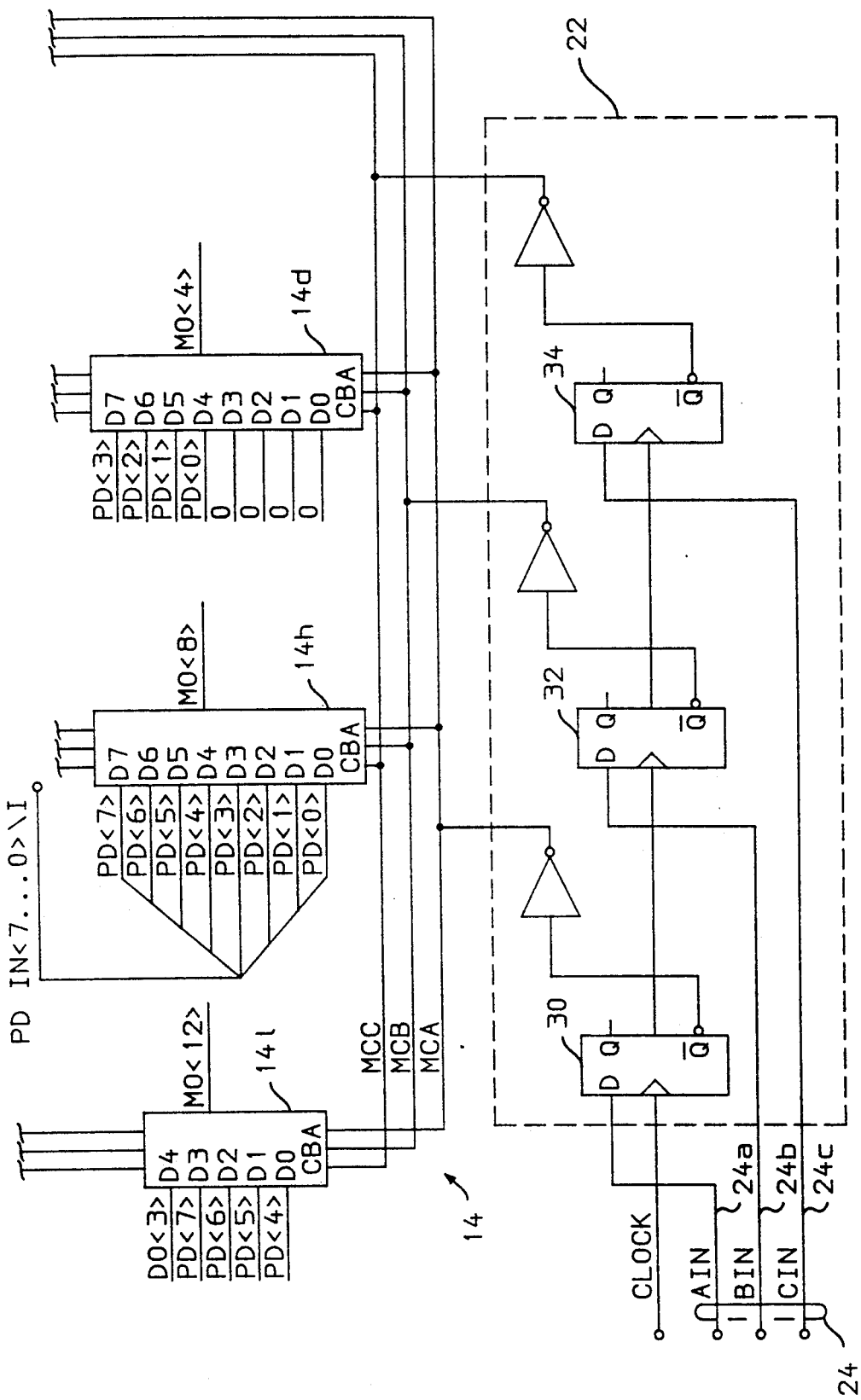

Referring now to FIGS. 7(a) and 7(b), fifteen parallel n:1 (8:1) multiplexers 14a-14o for outputting the eight bit wide payload envelope example of FIG. 2 are shown in detail. Each of the multiplexers is shown with its output signal line labeled from the most significant MO<15> through the least significant MO<1> and, to avoid confusion, the label "M", i.e., the "MO", shall be used to identify the multiplexers themselves as well, in lieu of referring separately to the identifying numerals 14a–14o throughout the discussion herein in connection with FIGS. 3 and 4. Thus, multiplexer M<15> corresponds to the multiplexer n+m of FIG. 1, and so on.

The nth multiplexer (M<8>) is responsive to all n (eight) bits (PDIN<7, . . . ,0>) from the buffer. Each multiplexer of successively greater significance above M<8> is correspondingly responsive at its least significant inputs to one less buffer input bit, dropping off the least significant bit with each higher multiplexer until M<15> is only responsive to PD<7>, bit 7 (MSB) of input signal 12. Similarly, successively less significant multiplexers below M<8> are responsive at their most significant inputs to successively one less of the most significant buffer input bits until M<1> is only responsive to PD<0>, bit 0 (LSB) of the input signal on line 12, bit 0 (LSB) of the input signal on the line 12. This is signified in FIG. 1 by showing the range of input bits to which each multiplexer is responsive to its left, e.g., the n+3 multiplexer is shown as responsive to $I_4$ through $I_n$. This provides an input lead hookup guide for the eight inputs. Additionally, each of the most significant m multiplexers are responsive to a corresponding one of the recirculated bits at inputs not responsive to any of the input bits PD<>. In other words, M<9> is responsive to the least significant recirculated bit (DO<0>) at its D7 input, M<10> to the next more significant recirculated bit (DO<1>) at its D6 and D7 inputs, and so on all the way up to M<15> which is responsive to the most significant recirculated bit (DO<6>) at inputs D1-D4. For the illustrated embodiment, it is unnecessary, in the case of multiplexers M<12> through M<15> to hookup the three most significant inputs D5-D7 to the recirculated bit in question because of the way the supplier of the ASIC (LSI Logic) in which this circuit was implemented designed their 5 to 1 multiplexer (5 bit noninverting multiplexer, part number MUX51H). If a select input on the line C shown on the specification sheets for that particular LSI Logic part is high, then input D4 is selected and select inputs A and B are don't cares. If this circuit were implemented in a different ASIC, then these may also need to be 8 to 1 multiplexers.

The control 22 is responsive to multiplexer select input signals AIN, BIN and CIN on lines 24a, 24b, 24c and are clocked into the D inputs of corresponding D flip-flops 30, 32, 34. Since the multiplexers 14a are in parallel, all will select the same input port, e.g., D3 in response to the select lines 24a, 24b, 24c causing a binary three to be provided at all the multiplexer select inputs MCA, MCB, MCC. This will cause the three most significant recirculated bits, DO<6,5,4> being output, respectively, from multiplexers M<15,14,13> and input bits PD<7, . . . ,0> output from multiplexers M<12, . . . ,5> with zeros on the remaining four bits MO<4, . . . ,1> to be recirculated. Thus, for that case, DO<6,5,4> and PD<7, . . . ,3> are output on line 18.

Figure 8:
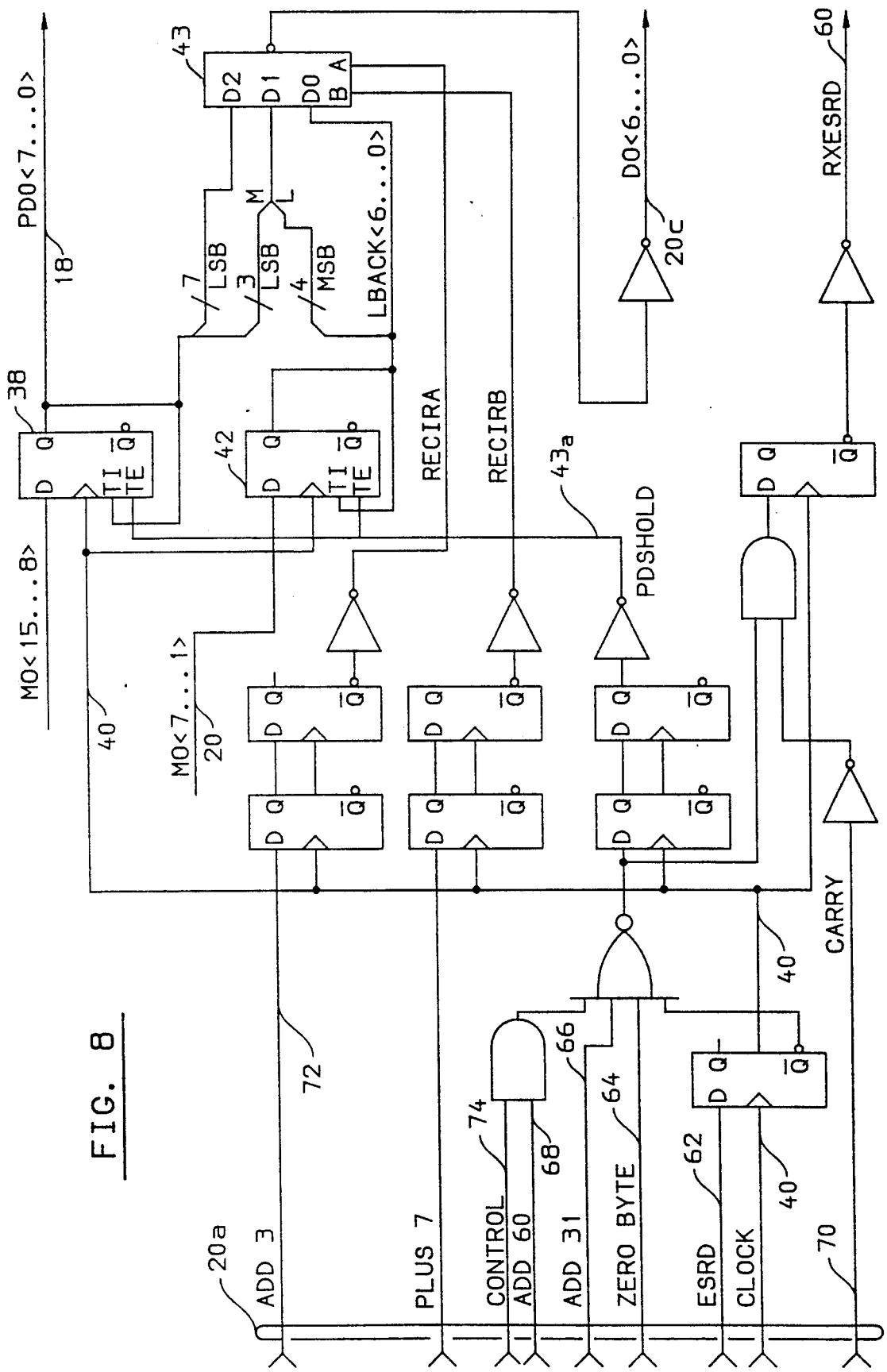
FIG. 8 shows a store such as may be used to perform the functions of the store of FIG. 1.

Referring now to FIG. 8, the eight most significant parallel output bits MO<15, . . . ,8> are shown being input to a parallel D flip-flop device 38 for being clocked out by a signal (e.g., 6.48 MHz for an asynchronous mapping for DS3 into an STS-1 SPE type of conversion circuit) on a line 40 as signals identified as PDO<7, . . . ,0> forming a parallel output byte on the line 18. The recirculated signals are the least significant bits in the shift register in excess of eight bits, i.e., bits MO<7, . . . ,0) during columns TOH, 1-3, 5-60, and 62-87, the LSBs in the shift register in excess of 5 bits during column 4, and the LSBs in the shift register in excess of 1 bit during 61 when the input signal CONTROL on a line 74 is active. These recirculated bits must be output in the next cycle on the bus PDO<7, . . . ,0> on the line 18. As shown in FIG. 8, the output bits MO<7, . . . ,1) are input to a parallel D flip-flop 42 and are clocked into a multiplexer 43 which selects the data bits to be recirculated. Normally, it outputs the 7 LSBs, MO<7 . . . 1> as bits DO<6, . . . ,0> on the recirculation bus 20c. During column 4, it outputs the three LSBs of PDO<7 . . . 0> and the four bits MO<7 . . . 4> on bus 20c. During column 61 when 1 1 bit is to be output (CONTROL active), it outputs the 7 LSBs of PDO<7 . . . 0> only. To make the circuit capable of outputting 8 to 1 bits, the multiplexer 43 would have to be an 8 to 1 multiplexer 43a as shown in FIG. 9.

A PDSHOLD signal on a line 43a forces the D flip-flops 38, 42 (which may be an FD2S D Flip-flop with clear/scan/standard drive of LSI Logic Corporation) to hold their current values. This is accomplished by connecting the output to a TI (test in) input. When a TE (test enable) inactive high, the TI input instead of the D input is clocked to the Q output. This is equivalent to a D FF with a multiplexer on the D input.

The recirculated data, DO<6, . . . ,0>, and the 8-bit data input from the buffer, PDIN<7, . . . ,0>, are connected to the inputs of the multiplexers M<15, . . . ,8> such that there are eight possible sets of data on the multiplexer outputs. These sets consist of eight to fifteen bits in parallel, depending on the number of bits being recirculated. If zero bits are being recirculated, the output contains only the eight data bits input from the buffer. If seven bits are being recirculated, the output contains fifteen bits, seven recirculated bits plus eight data bits. The multiplexers have been arranged such that the binary value of the multiplexer select inputs on line 24 equals the number of bits being recirculated. The multiplexer inputs are arranged such that the recirculated bits, if any, are output by the most significant multiplexers, and the data input from the buffer is output on the immediately following multiplexers.

An RXESRD signal on a line 60 controls the buffer read operation to generate the eight bit byte gaps in columns 1-3, 30-32 and 59-60 and the TOH in PDO<7, . . . ,0>. The RXESRD signal on the line 60 is the result of gating a control signal ESRD on a line 62 with other control signals included in the generalized line 20a of FIG. 1 including ZEROBYTE, ADD31, ADD60, and CARRY on lines 62, 64, 66, 68 and 70, respectively. The RXESRD signal controls the read counter which generates the read address for the buffer. When this signal is active high, the read counter increments the read address every cycle and the shift register inputs new information bits on the signal line 12. When this signal is inactive low, the read counter holds its count and no new information (I) bits are presented to the shift register on signal line 12.

The ESRD signal on the line 62 is provided by an STS-1 frame generator and is active low for the three transport overhead (TOH), in this example, just before column 1 of FIG. 2 and high for the eighty-seven SPE columns, thus forming a 3 byte gap at the TOH location.

Referring back to FIG. 2, it should be realized that one row of the SONET Synchronous Payload Envelope (SPE) is there shown. The SPE is 87 bytes by 9 rows and is located inside the SONET frame. The SPE is labeled columns 1 through 87 as shown there. A SONET STS-1 frame is 90 bytes by 9 rows. It should be understood that the columns in the STS-1 frame are generally labeled 1 through 90. Thusly labeled, the Transport Overhead (TOH) is located in columns 1, 2, and 3 and the SPE is located in STS-1 frame columns 4 through 90. The circuit 10 outputs a pattern that repeats every 90 bytes, a row of the STS-1 frame. But, the counter controlling the circuit is a divide by 87, a SPE pattern generator (not shown). Therefore, the specification describes the SPE column locations decoded from the divide by 87 counter output. The STS-1 frame generator controls the circuit 10 by means of the ERSD signal on the line 62 shown in FIG. 8. The ERSD signal is active for 87 clock cycles and inactive for 3 clock cycles. When ESRD is inactive (a low in the circuit of FIG. 8), all circuits controlling the read operation are held, i.e., the divide by 87 counter is disabled and its count held, and the data in the flip-flops 38 and 42 of FIG. 8 is held. This action generates the 3 byte gap which will be the location for the TOH.

An illustration follows in FIGS. 10-18 to describe the operation during columns 87, the three columns of STS-1 Transport Overhead (TOH), and columns 1-5, in the same style as presented above in FIGS. 3-6.

Figure 10:
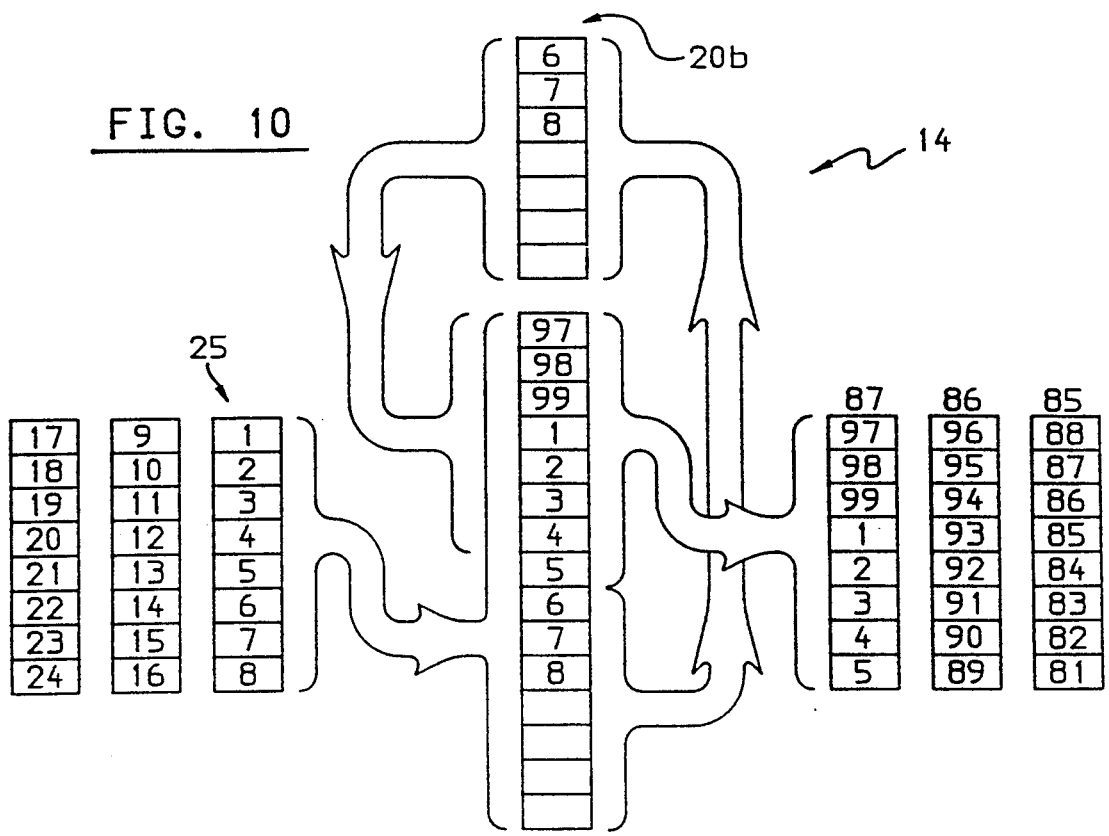

For the representation of FIG. 10, the select line 20d of FIG. 1 will provide a binary three to the multiplexers 14. This will cause the multiplexers to output byte 25 on the fourth through the eleventh most significant multiplexer outputs as shown. Thus, only the five most significant bits of byte 25 are output as column 87 with the three most significant bits having been recirculated from the previous cycle. The three least significant bits of the byte 25 are loaded into storage device 20b until needed during the next information input/output cycle.

Figure 11:
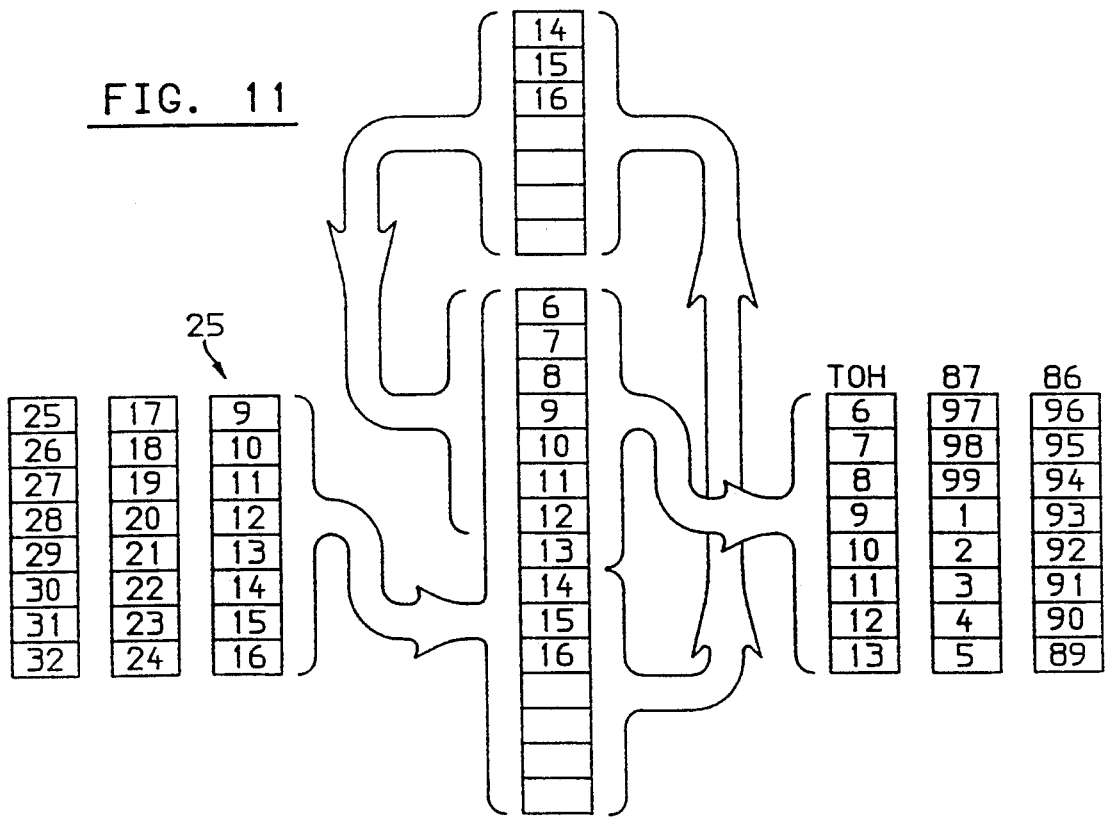
Figure 12:
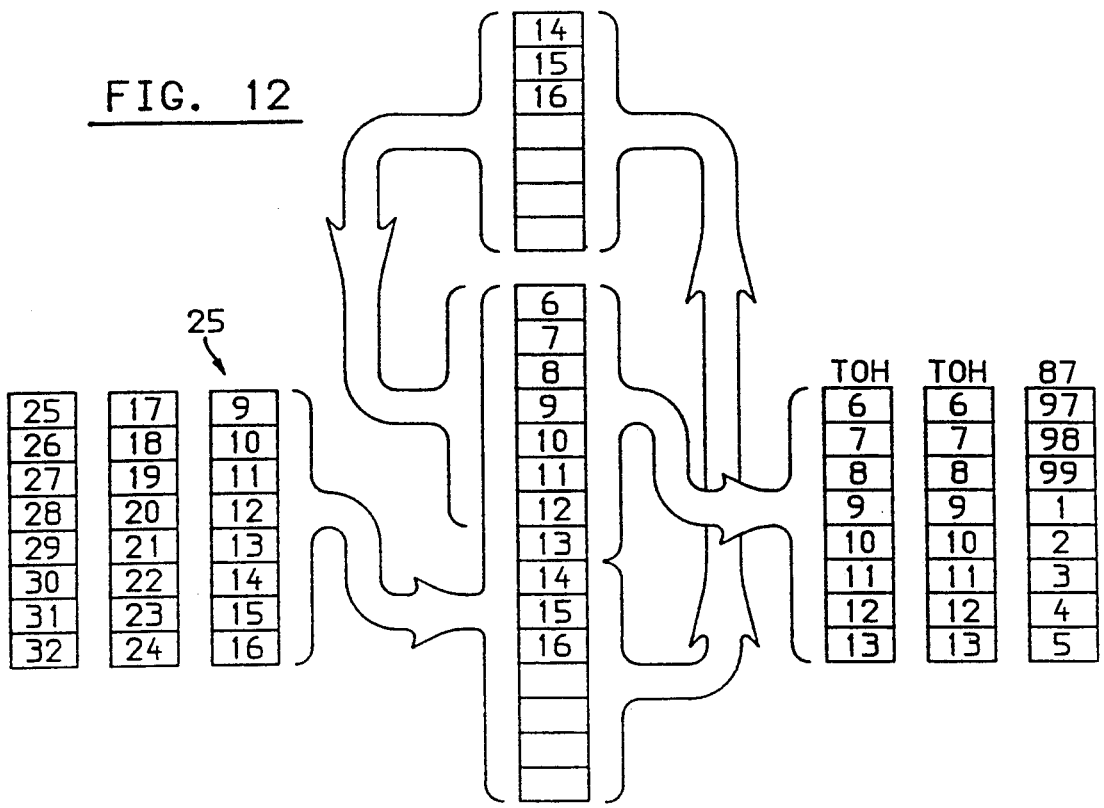
Figure 13:
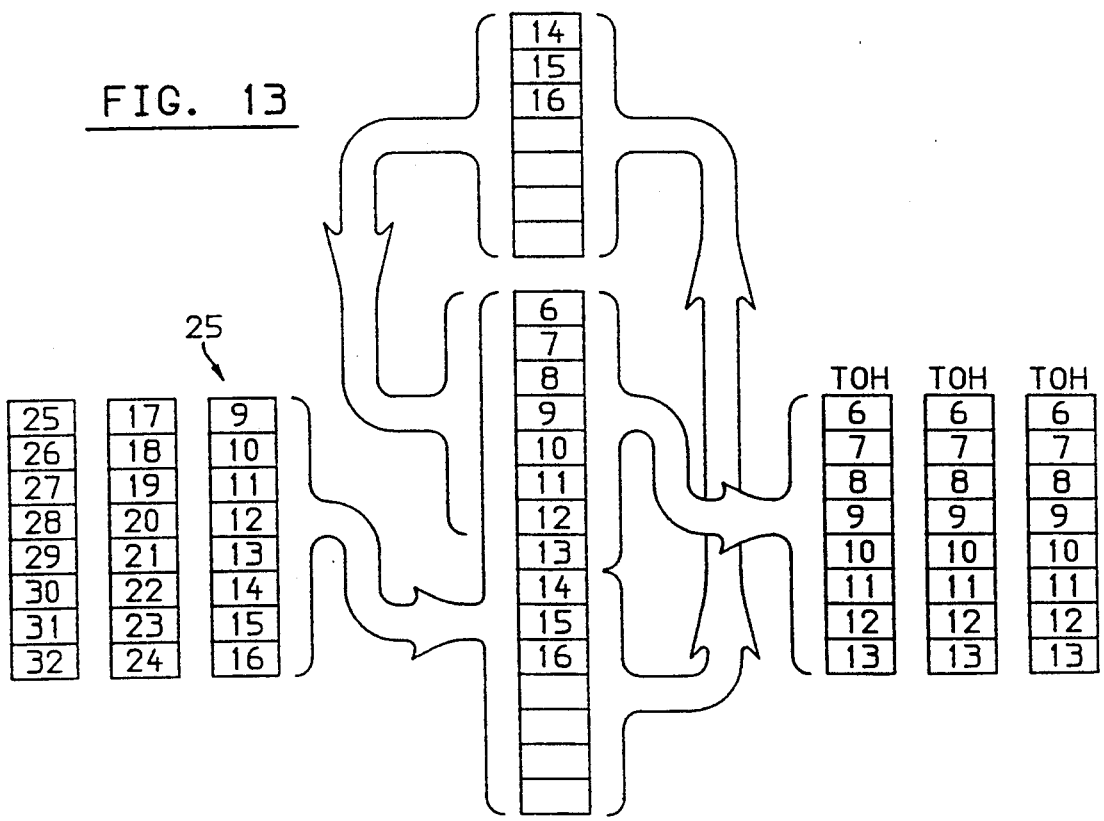

FIGS. 11-13 show the creation of the TOH columns. During the first cycle, the Information I bits are input by the register. In the following cycles, the Information bits are held in the register and no new Information I bits are input from the signal line 12. All of these columns will be overwritten in a different circuit (not shown).

Figure 14:
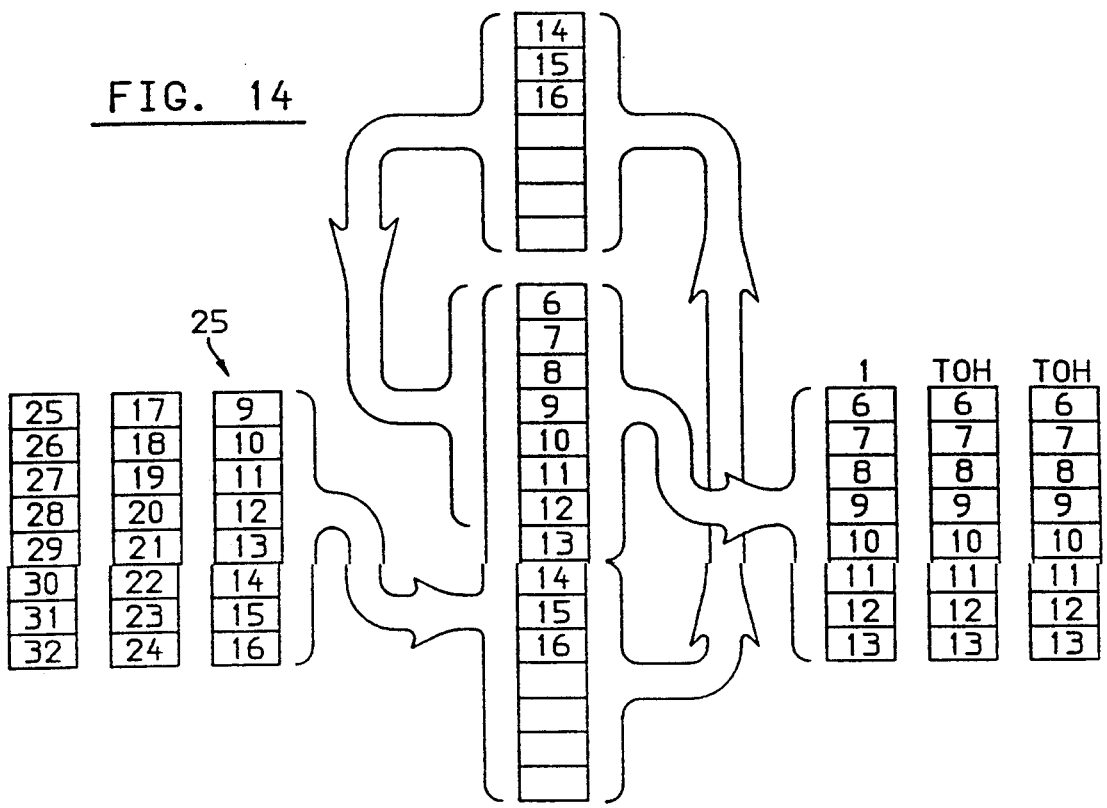
Figure 15:
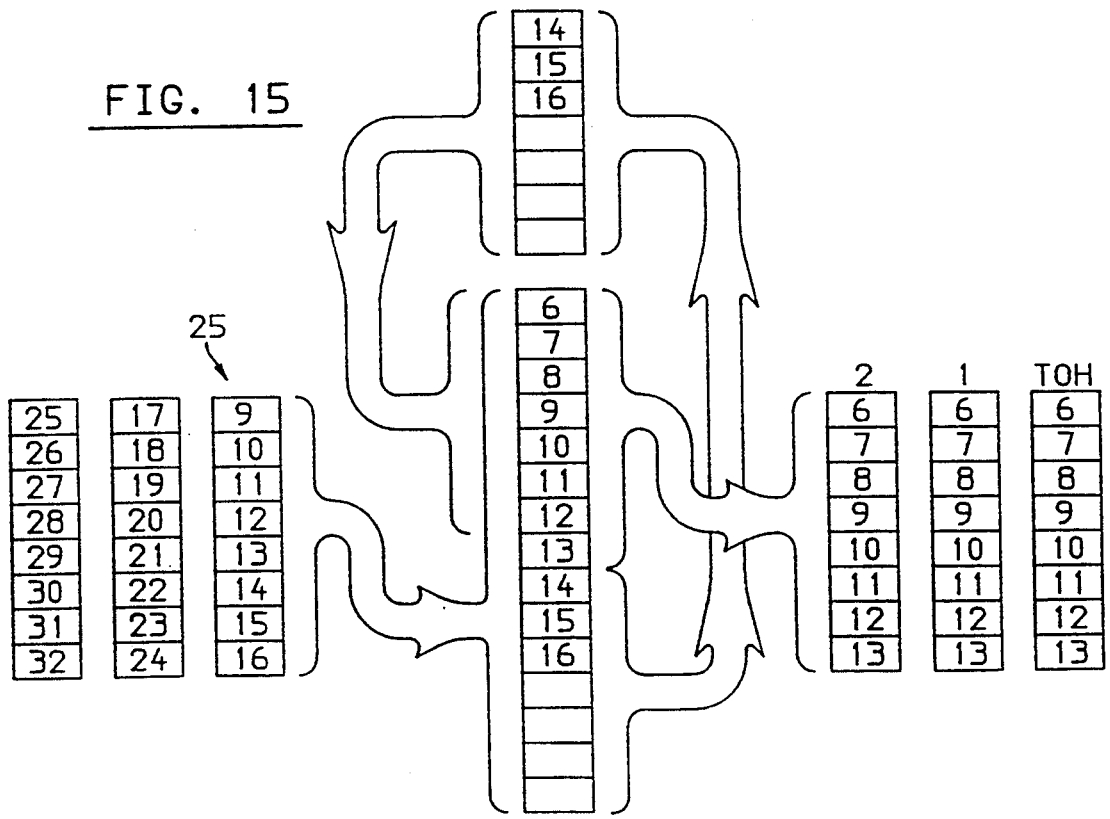
Figure 16:
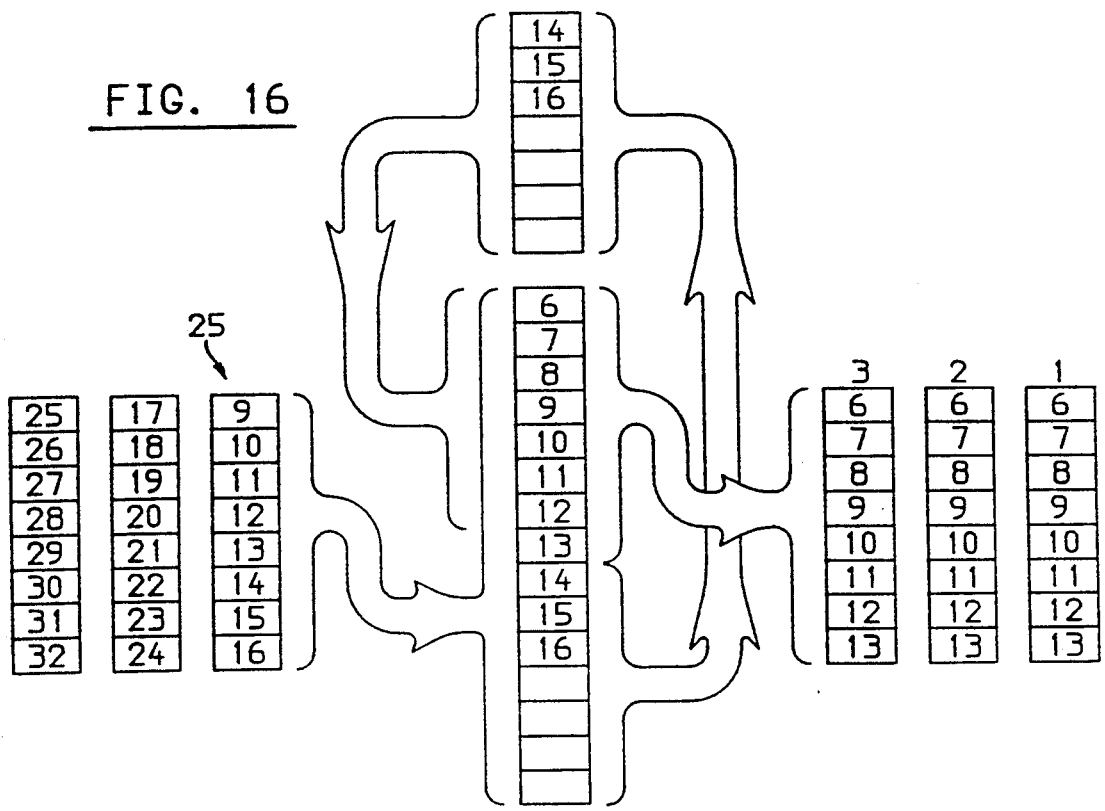

FIGS. 14-16 show the creation of SPE columns 1-3. During these columns, the Information bits are held in the register and no new Information I bits are input from the signal line 12. All of these columns will be overwritten in a different circuit (not shown).

Figure 17:
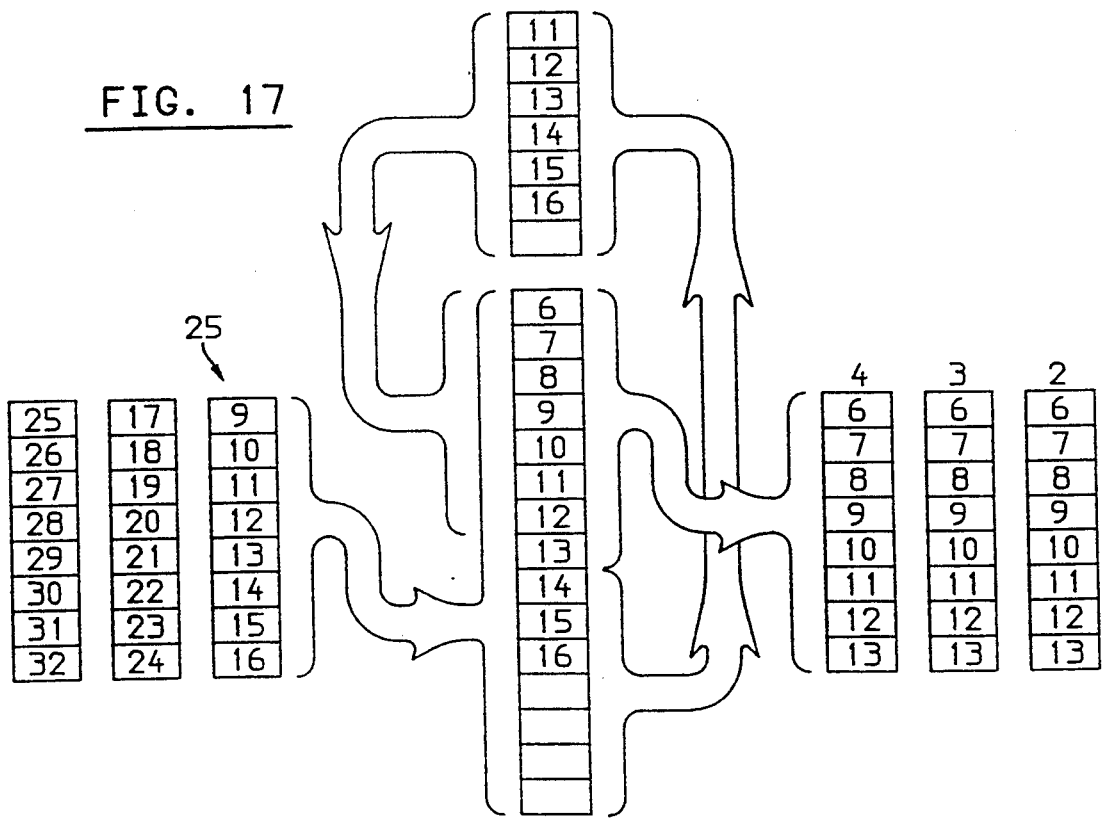

FIG. 17 shows the creation of SPE column 4, which contains 5 I bits. Control signal ADD3 on the line 72 identifies this as column 4. This signal controls the select lines 20a of multiplexer 20b causing it to recirculate on line 20c the three least significant bits of the current output on line 18, as well as the remaining m bits on the line 20.

FIG. 18 shows the creation of SPE column 5, which contains 8 I bits. The select line 20d now provides a binary 6 to the multiplexers 14. This will cause the multiplexers to output byte 25 on the seventh through the fourteenth most significant multiplexer outputs as shown. Thus, only the two most significant bits of byte 25 are output as column 5 with the six most significant bits having been recirculated from the previous cycle. The six least significant bits of the byte 25 are loaded into storage device 20b until needed during the next information input/output cycle.

Figure 19:
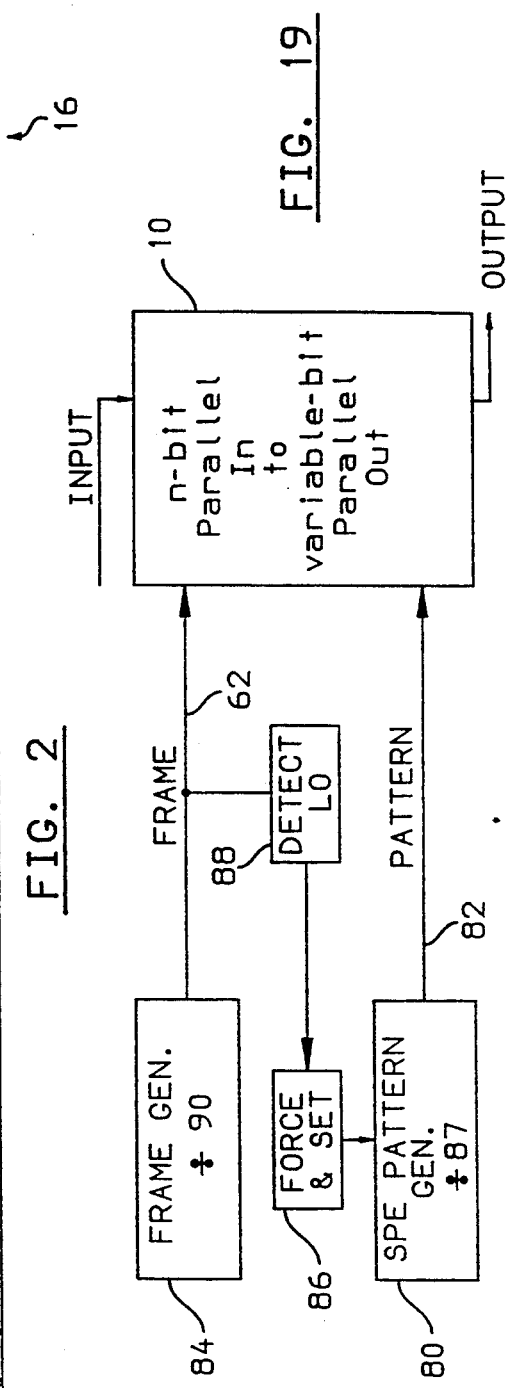
FIG. 19 shows how the device 10 of FIG. 1 may be used to easily start the SPE anywhere within the frame.

I have thus described the TOH being output to show how the external STS-1 frame generator controls the register through the input signal ESRD (Elastic Store ReaD) on the line 62. It will thus be seen that the circuit 10 can place SPE column 1 next to the TOH as well as a second location. This is one of the advantages of the present invention, i.e., referring to FIG. 19, an SPE pattern generator 80 which generates the column addresses on a line 82 can be controlled by a frame generator 84, allowing the SPE pattern to start at a known location in the STS-1 frame. In the ASIC utilized, the frame generator 84 is a divide by 90 counter which determines the location of the TOH by generating the signal ESRD on the line 62. The SPE pattern generator is a divide by 87 counter which is "stretched" to cover 90 clock cycles by forcing it to hold its count for the 3 clock cycles ESRD is inactive (low). Forcing it to hold its count and setting the divide by 87 counter to a known value by means of a force and set device 86 when ESRD is detected inactive by a detector 88 will fix the SPE pattern to a known place within the STS-1 frame.

The signal ESRD on the line 62 locates the TOH and forces the shift register to hold its current data, thus inserting gaps or stuff bits into the data signal. The other control signals within the group of signals 20a add similar gaps to the data.

Referring back to FIG. 8, ZEROBYTE identifies the SPE columns which are required to have a value of 0 (the bytes with R (fixed stuff) bits only, i.e., SPE columns 1-3, 30, 31, 59 and 60. ADD31 indicates column 32. ADD60 identifies column 61. The signal PLUS7 is generated in a different circuit (not shown) by the logical AND of ADD60 and the inverse of the signal CONTROL. PLUS7 indicates when a single information bit will be inserted into column 61. The signal RXESRD on the line 60 is generated in this circuit by combining all of these signals plus the signal CARRY on the line 70. CARRY disables the read operation when the addition of eight bits in the shift register would cause an overflow. An overflow will occur when more than seven bits are required to be recirculated, which can occur in columns four and sixty-one.

The recirculated data will consist of one to three sets of multiplexer outputs. During columns containing eight I bits, the outputs of $M<15,\ldots,0>$ are output as $PDO<7,\ldots,0>$, and the outputs of the multiplexers $M<7,\ldots,1>$ are recirculated as $DO<6,\ldots,0>$.

During column four the outputs of $M<15,\ldots,11>$ are output as $PDO<7,\ldots,3>$ (the state of $PDO<2\ldots,0>$ is don't care). The outputs $M<10,\ldots,4>$ are recirculated. The value of select line 24 is incremented by three during this column by means of an ADD3 signal on a line 72. For clarification, the select line 24 in FIG. 1, for one implementation, is the output of a three bit adder which has two fixed addition values, 3 and 7. Thus, as stated earlier, the value on the select line 24 is equal to the number of bits being recirculated. Therefore, during column 4 when 3 additional bits are required to be recirculated, 3 is added to the current value in the adder. Similarly, during column 61 when a single information (I) bit is output by the shift register, 7 is added to the current value in the adder. So, it is true that the select line 24 is incremented by three during this column by means of an ADD3 signal on the line 72, but this is done in a circuit (not shown) external to this shift register. Also, the adder circuit does have a carry out signal, which is the CARRY signal on the line 70, in the circuit 10.

If the number of bits previously being recirculated is four or less, then CARRY is not active and a new byte is input from the buffer at the multiplexers selected by select lines 24a, 24b, 24c. If the number of bits previously being recirculated is greater than four, then CARRY is active and the read from the buffer is disabled. In this case, the number of bits which need to be recirculated is either 8, 9, or 10. The correct bits will be output by recirculating MO<10, . . . ,4>, holding the previous buffer output, and applying it to the multiplexers selected by select lines 24a, 24b, 24c.

During column sixty-one, when a CONTROL signal on a line 74 is active, the output of M<15> is output as PDO<7> (the state of PDO<6, . . . ,0) is don't care). The outputs MO<14, . . . ,7> are recirculated. The value of select lines 24a, 24b, 24c is incremented by seven during this column. If the number of bits previously being recirculated is zero, then CARRY is not active and a new byte is input from the buffer at the selected multiplexers.

Of course, the CARRY signal is necessary in both column 4 and 61. Continuing with the example here, where the select line 24 now has a value of binary 6, and assuming that no information bit was inserted in column 61, then in column 4 of the next row, 3 additional bits need to be recirculated, bringing the total to 9 bits. The value 3 is added in the adder circuit, causing the CARRY signal to be active and the select line 24 to contain the binary value 1. When the number of bits required to be recirculated is 8 or greater, the CARRY signal will be active and no new information (I) bits will be input from the buffer on signal line 12. So in this example, 8 I bits will be output in column 5 and 1 bit will be recirculated.

If the number of bits previously being recirculated is greater than zero, then CARRY is active and the read from the buffer is disabled. In this second case, the number of bits which need to be recirculated is from eight to fourteen. The correct bits will be output by recirculating MO<14, . . . ,7>, holding the previous buffer output, and applying it to the multiplexers selected by select lines 24a, 24b, 24c.

The information bits for columns 4 and 61 are output as the MSBs from the circuit 10 just to reduce its complexity. The output of the circuit 10 is immediately input to a multiplexer (not shown) which shifts the information I bits to the proper locations, inserts 0 for the R (fixed stuff) bits and O (overhead communications channel) bits, and sets the C (stuff control) bits to the proper value.

A number of D flip-flops are shown in FIG. 8 in between the control signals 20a and the flip-flops 38, 42 and are for the purpose of delay, to match delays in the data path and need not be described in detail.

Although the invention has been described to illustrate an n-bit parallel in, variable bit parallel out shift register, in the context of a bit stuffing multiplexer having a particular architecture, it should be realized the architecture described has peculiarities dictated by the requirements of the frame of FIG. 2. For other types of frames, the number and positional relation of the recirculated bits with respect to the output bits would change. For example, the register 10 of FIG. 1 has to be able to stuff the seven most significant bits of the eight bit output. A shift register required to stuff a lesser number of stuff bits may have more than one I bit (the n bit) in between the bits 1 and n−1 output for recirculation and the recirculated input bits n+1 and n+m. In other words, the size of the variable bit shift register is dictated by the size of the largest number of bits to be stuffed relative to the number of bits in rows in the SPE.

Thus, if the number of rows is eight and the maximum number of stuff bits is six it is only necessary to use fourteen multiplexers, as only six bits need to be recirculated. Moreover, the requirements of either or both of the circuits of FIGS. 7(a) & 7(b) and 8 will change according to the number and complexity of the bit stuffing patterns required.

Thus, although the invention has been shown and described with respect to an embodiment thereof, it should be realized that many other embodiments may be implemented utilizing the teachings herein and be within the scope of the appended claims.

Having described the invention what is claimed is:

1. A method, comprising the steps of:
   in a selected plurality of successive cycles,
   in response to (i) a plurality of control signals, (ii) an n bit parallel information input signal and (iii) an m bit recirculated signal from a prior cycle,
   providing a selected one of n possible n bit output signals, each possible n bit output signal having zero to m recirculated bits, and
   providing m bits of a combination of said n bit input signal and m bit recirculated signal for recirculation.

2. Apparatus, comprising:
   means, responsive, in a selected plurality of successive cycles, to (i) a select signal, (ii) an n bit parallel information input signal and (iii) an m bit recirculated signal from a prior cycle, for providing a selected one of n possible n bit output signals, each possible n bit output signal having zero to m recirculated bits; and
   means, responsive to a control signal, for providing m bits of a combination of said n bit input signal and m bit recirculated signal as said recirculated signal on a succeeding cycle.

3. A method, comprising the steps of providing, in alternating first and second cycles, in response to alternating first and second incoming n bit parallel input data signals and in response to a selected magnitude of a stuff bit count signal in each of said first and second alternating cycles, m recirculated bits as the more significant bits and n−m of the more significant data bits as the less significant bits of an n bit output signal in said first alternating cycle and the less significant m bits of said first incoming n bit parallel input signal as the more significant bits and n−m bits of said second incoming n bit parallel input data signal as the less significant bits of said n bit output signal.

4. A method, comprising the steps of:
   providing, in a first cycle, in response to a first incoming n bit parallel input data signal and in response to the magnitude of a stuff bit count signal in said first cycle, m stuff bits as the less significant bits and n−m of the more significant data bits as the more significant bits of an n bit output signal; and
   providing, in a second cycle, in response to a second incoming n bit parallel input data signal and in response to the magnitude of said stuff bit count signal in said second cycle, the less significant m bits of said first incoming n bit parallel input signal as the more significant bits and n−m bits of said second incoming n bit parallel input data signal as the less significant bits of said n bit output signal.

5. Apparatus, comprising:
   n+m parallel multiplexers, responsive to a recirculated bit count signal and to an n-bit parallel data input signal, for providing m recirculated bits as output signals of an m most significant group of bits of said n+m parallel multiplexers and for providing said n-bit parallel data input signal as output signals of a next most significant group of bits of n contiguous multiplexers of said n+m parallel multiplexers and for providing n output signals having the most significance of said n+m parallel multiplexers; and storage means, responsive to an m number of least significant output signal bits of said n+m parallel multiplexers, for storing said m number of least significant output signal bits and for providing said m number of least significant signal bits for selection as output signals of said m most significant group of bits of said n+m multiplexers.

6. Apparatus, comprising:

an n-bit parallel input to variable-bit parallel output shift register, responsive to a frame signal, a pattern signal and an input signal, for providing gaps in the input signal according to the frame signal and the pattern signal; and means, responsive to the frame signal, for controlling the phase of the pattern signal with respect to the frame signal.

7. A method of inserting stuff bits in a data signal having data bits, comprising the steps of:

providing each bit of an incoming n-bit parallel data signal, obtained during a buffer read cycle, to a selected plurality of input bit positions of an n+m bit shift register where input bits selected to be output bits of said shift register are selected according to a number of stuff bits to be inserted;

preventing application of further incoming data signal bits to said register until at least some bits of previously input data bits are output as data bits rather than stuff bits;

outputting the n most significant bits of said shift register each read cycle;

temporarily storing m bits, comprising the m least significant bits of said shift register, not previously read out as data bits, after each read cycle; and recirculating said temporarily stored bits, each such recirculated bit for being provided to a selected plurality of the m most significant input bit positions of said shift register upon a next application of incoming data bits to said selected plurality of input bit positions.

* * * * *

UNITED STATES PATENT AND TRADEMARK OFFICE
CERTIFICATE OF CORRECTION

PATENT NO. : 5,272,703

DATED : December 21, 1993

INVENTOR(S) : R. Peters

It is certified that error appears in the above-identified patent and that said Letters Patent is hereby corrected as shown below:

On the title page, Abstract, line 6, delete "outputted".

At column 12, line 10, prior to "register", please insert --shift--.

Signed and Sealed this

Twenty-first Day of June, 1994

Attest:

BRUCE LEHMAN

Attesting Officer

Commissioner of Patents and Trademarks